United States Patent
Chau et al.

(10) Patent No.: US 7,038,892 B2
(45) Date of Patent: May 2, 2006

(54) APPARATUS HAVING A HARD BIAS SEEDLAYER STRUCTURE FOR PROVIDING IMPROVED PROPERTIES OF A HARD BIAS LAYER

(75) Inventors: Phong V. Chau, San Jose, CA (US); James Mac Freitag, San Jose, CA (US); Mustafa Michael Pinarbasi, Morgan Hill, CA (US); Hua Ai Zeng, San Jose, CA (US); Howard Gordon Zolla, San Jose, CA (US)

(73) Assignee: Hitachi Global Storage Technologies Netherlands, B.V., (NL)

( * ) Notice: Subject to any disclaimer, the term of this patent is extended or adjusted under 35 U.S.C. 154(b) by 122 days.

(21) Appl. No.: 10/674,831

(22) Filed: Sep. 30, 2003

(65) Prior Publication Data
US 2005/0068696 A1   Mar. 31, 2005

(51) Int. Cl.
*G11B 5/39* (2006.01)

(52) U.S. Cl. .............................................. 360/324.12
(58) Field of Classification Search ............ 360/324.12
See application file for complete search history.

(56) References Cited

U.S. PATENT DOCUMENTS

| | | | |
|---|---|---|---|
| 6,144,534 A | 11/2000 | Xue et al. | |
| 6,278,592 B1 | 8/2001 | Xue et al. | |
| 6,396,669 B1 | 5/2002 | Gill | |
| 6,404,606 B1 | 6/2002 | Pinarbasi | |
| 2002/0015268 A1* | 2/2002 | Mao et al. ............. | 360/324.12 |
| 2002/0085322 A1 | 7/2002 | Pinarbasi | |
| 2002/0154458 A1 | 10/2002 | Lin et al. | |

\* cited by examiner

*Primary Examiner*—A. J. Heinz
(74) *Attorney, Agent, or Firm*—Chambliss, Bahner & Stophel, P.C.; David W. Lynch (57) ABSTRACT

An apparatus having improved hard bias properties of layers of a magnetoresistance sensor is disclosed. Properties of the hard bias layer are improved using a seedlayer structure that includes at least a layer of silicon and a layer comprising chromium or chromium molybdenum. Further, benefits are achieved when the seedlayer structure includes a layer of tantalum.

28 Claims, 6 Drawing Sheets

APPARATUS HAVING A HARD BIAS SEEDLAYER STRUCTURE FOR PROVIDING IMPROVED PROPERTIES OF A HARD BIAS LAYER

BACKGROUND OF THE INVENTION

1. Field of the Invention

This invention relates in general to magnetic storage systems, and more particularly to an apparatus having improved hard bias properties of layers of a magnetoresistance sensor.

2. Description of Related Art

Magnetic recording is a key and invaluable segment of the information-processing industry. While the basic principles are one hundred years old for early tape devices, and over forty years old for magnetic hard disk drives, an influx of technical innovations continues to extend the storage capacity and performance of magnetic recording products. For hard disk drives, the areal density on the magnetic medium has increased by a factor of millions since the first disk drive was applied to data storage. Such increases are based on corresponding improvements in heads, media, drive electronics, and mechanics.

Magnetic recording heads have been considered the most significant factor in areal-density growth. The ability of the magnetic recording heads to both write and subsequently read magnetically recorded data from the medium at data densities well into the gigabits per square inch (Gbits/in$^2$) range gives hard disk drives the power to remain the dominant storage device for many years to come.

Important components of computing platforms are mass storage devices including magnetic disk and magnetic tape drives, where magnetic tape drives are popular, for example, in data backup applications. The magnetic disk drive includes a rotating magnetic disk, write and read heads that are suspended by a suspension arm above the rotating magnetic disk and an actuator that swings the suspension arm to place the read and write heads over selected circular tracks on the rotating disk.

Read and write heads are directly mounted on a slider that has an Air-Bearing Surface (ABS) between the slider and the rotating disk. The suspension arm biases the slider into contact with the surface of the magnetic disk when the magnetic disk is not rotating. However, when the magnetic disk rotates, air is swirled by the rotating disk adjacent to the ABS causing the slider to ride on a cushion of air just above the surface of the rotating magnetic disk.

The write and read heads are employed for writing magnetic data to and reading magnetic data from the rotating disk. The read and write heads are connected to processing circuitry that operates according to a computer program to implement the writing and reading functions.

A magnetoresistive (MR) sensor detects magnetic field signals through the resistance changes of a sensing element as a function of the strength and direction of magnetic flux being sensed by the sensing element. Conventional MR sensors, such as those used as MR read heads for reading data in magnetic recording disk and tape drives, operate on the basis of the anisotropic magnetoresistive (AMR) effect of the bulk magnetic material, which is typically permalloy. A component of the read element resistance varies as the square of the cosine of the angle between the magnetization direction in the read element and the direction of sense current through the read element. Recorded data can be read from a magnetic medium, such as the magnetic disk in a magnetic disk drive, because the external magnetic field from the recorded magnetic medium (the signal field) causes a change in the direction of magnetization in the read element, which in turn causes a change in resistance of the read element. This change in resistance may be used to detect magnetic transitions recorded on the recording media.

In the past several years, prospects of increased storage capacity have been made possible by the discovery and development of sensors based on the giant magnetoresistance (GMR) effect, also known as the spin-valve effect. In a spin valve sensor, the GMR effect varies as the cosine of the angle between the magnetization of the pinned layer and the magnetization of the free layer. Recorded data can be read from a magnetic medium because the external magnetic field from the recorded magnetic medium, or signal field, causes a change in the direction of magnetization of the free layer, which in turn causes a change in the resistance of the spin valve sensor and a corresponding change in the sensed current or voltage.

Magnetic sensors utilizing the GMR effect are found in mass storage devices such as, for example, magnetic disk and tape drives and are frequently referred to as spin-valve sensors. The spin-valve sensors are divided into two main categories, the Anti-FerroMagnetically (AFM) pinned spin valve and the self-pinned spin valve. A spin valve includes a pinned layer, a spacer and a free layer. The magnetization of the free layer is free to rotate in response to the presence of external magnetic fields. In an AFM pinned spin valve, the pinned layer has its magnetic moment pinned by a pinning layer. In the self-pinned spin valve, the magnetic moment of the pinned layer is pinned in the fabrication process.

The magnetic moment of the pinned layer may be pinned via magnetostriction phenomenon and stress anisotropy. Magnetostriction is the phenomenon in which a magnetic material changes its size depending on its state of magnetization. External mechanical stress may also contribute to the state of the magnetic moment. For example, a positive magnetostriction and compressive stress may be used to pin the pinned layer with the desired magnetic moment orientation. The self-pinned layer may be formed of a single layer of a single material or may be a composite layer structure of multiple materials. It is noteworthy that a self-pinned spin valve requires no additional external layers formed adjacent to the pinned layer to maintain a desired magnetic orientation of the pinned layer and, therefore, is considered to be an improvement over the anti-ferromagnetically pinned spin valve.

In the construction of a sensor using the GMR effect, a hard magnetic bias structure may be used to suppress the domain walls movement of the free layer to provide a noise-free reproducing waveform. This is accomplished by depositing hard magnetic thin films on both sides of the spin valve layers. A seedlayer structure is typically used to promote the texture of the hard bias films. Chromium is often used as a hard bias seedlayer whereupon the hard bias layers are grown. However, properties of the hard bias layers degrade significantly when deposited on spin valve layers. In order to make better junctions, partially milled sensor structures down to platinum manganese (PtMn) or other spin valve layers have been considered. The properties of the hard bias layer, however, are degraded significantly on PtMn or on other spin valve layers when deposited using the standard chromium (Cr) seedlayer.

It can be seen therefore, that there is a need for an apparatus having improved hard bias properties of layers of a magnetoresistance sensor.

SUMMARY OF THE INVENTION

To overcome the limitations in the prior art described above, and to overcome other limitations that will become apparent upon reading and understanding the present specification, the present invention discloses an apparatus having improved hard bias properties of layers of a magnetoresistance sensor.

The present invention improves the properties of a hard bias layer using a seedlayer structure that includes at least a first layer of silicon and a second layer comprising chromium or chromium molybdenum. Further, benefits are achieved when the seedlayer structure includes a layer of tantalum.

A magnetic storage system in accordance with the principles of the present invention includes a moveable magnetic recording medium, an actuator disposed proximate to the moveable magnetic recording medium and a read head, coupled to the actuator, for reading data on the moveable magnetic recording medium, the read head comprising a spin valve structure including a ferromagnetic free layer structure that has a magnetic moment, a ferromagnetic pinned layer structure having a magnetic moment, a nonmagnetic conductive spacer layer between the free layer structure and the pinned layer structure and an anti-ferromagnetic pinning layer coupled to the pinned layer structure for pinning the magnetic moment of the pinned layer structure, hard magnetic thin films disposed on both sides of the free layer structure and a hard bias seedlayer structure adjacent to at least a portion of the spin valve structure, wherein the hard bias seedlayer structure comprises at least a layer comprising silicon and a layer comprising chromium or chromium molybdenum.

In another embodiment of the present invention, a magnetic storage system is provided. The magnetic storage system includes a read head, coupled to the actuator, for reading data on the moveable magnetic recording medium, the read head comprising a spin valve structure including a ferromagnetic free layer structure that has a magnetic moment, a ferromagnetic pinned layer structure having a magnetic moment, a nonmagnetic conductive spacer layer between the free layer structure and the pinned layer structure and an anti-ferromagnetic pinning layer coupled to the pinned layer structure for pinning the magnetic moment of the pinned layer structure, hard magnetic thin films disposed on both sides of the free layer structure and a hard bias seedlayer structure adjacent to at least a portion of the spin valve structure, wherein the hard bias seedlayer structure comprises at least a layer comprising silicon and a layer comprising chromium or chromium molybdenum.

In another embodiment of the present invention, a spin valve sensor is provided. The spin valve sensor includes a spin valve structure including a ferromagnetic free layer, a ferromagnetic pinned layer and an anti-ferromagnetic pinning layer, hard magnetic thin films disposed on both sides of the spin valve structure and a hard bias seedlayer structure adjacent to at least a portion of the spin valve structure, wherein the hard bias seedlayer structure comprises at least a layer comprising silicon and a layer comprising chromium or chromium molybdenum.

In another embodiment of the present invention, a read sensor is provided. The read sensor includes means for providing a spin valve structure, means for providing a spin valve structure further comprising means for providing a ferromagnetic free layer structure that has a magnetic moment, means for providing a ferromagnetic pinned layer structure having a magnetic moment, means for providing a nonmagnetic conductive spacer layer between the means for providing a ferromagnetic free layer structure and the means for providing a ferromagnetic pinned layer structure and means for providing an anti-ferromagnetic pinning layer coupled to the means for providing a pinned layer structure for pinning the magnetic moment of the pinned layer structure, means for providing hard magnetic thin films adjacent to at least a portion of the means for providing a spin valve structure and means for providing a hard bias seedlayer structure adjacent the at least a portion of the means for providing a spin valve structure, wherein the means for providing a hard bias seedlayer structure comprises at least a layer comprising silicon and a layer comprising chromium or chromium molybdenum.

In another embodiment of the present invention, another spin valve sensor is provided. This spin valve sensor includes means for providing a spin valve structure including free means, pinned means and an pinning means, means for providing hard magnetic thin films in an abutting relationship with the means for providing a spin valve structure on both sides of the means for providing a spin valve structure and means for providing a hard bias seedlayer structure adjacent the means for providing a spin valve structure, wherein means for providing the hard bias seedlayer structure comprises at least a layer comprising silicon and a layer comprising chromium or chromium molybdenum.

In another embodiment of the present invention, a hard bias seedlayer is provided. The hard bias seedlayer is adjacent a pinning layer structure and includes at least a layer comprising silicon and a layer comprising chromium or chromium molybdenum.

These and various other advantages and features of novelty which characterize the invention are pointed out with particularity to the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings, which form a part hereof, and in which is shown by way of illustration the specific embodiments in which the invention may be practiced. It is to be understood that other embodiments may be utilized as structural changes may be made without departing from the scope of the present invention.

The present invention provides an apparatus having improved hard bias properties of layers of a magnetoresistance sensor. Properties of the hard bias layer are improved using a seedlayer structure that includes at least a first layer of silicon and a second layer comprising chromium or chromium molybdenum. Further, benefits are achieved when the seedlayer structure includes a layer of tantalum.

Figure 1:
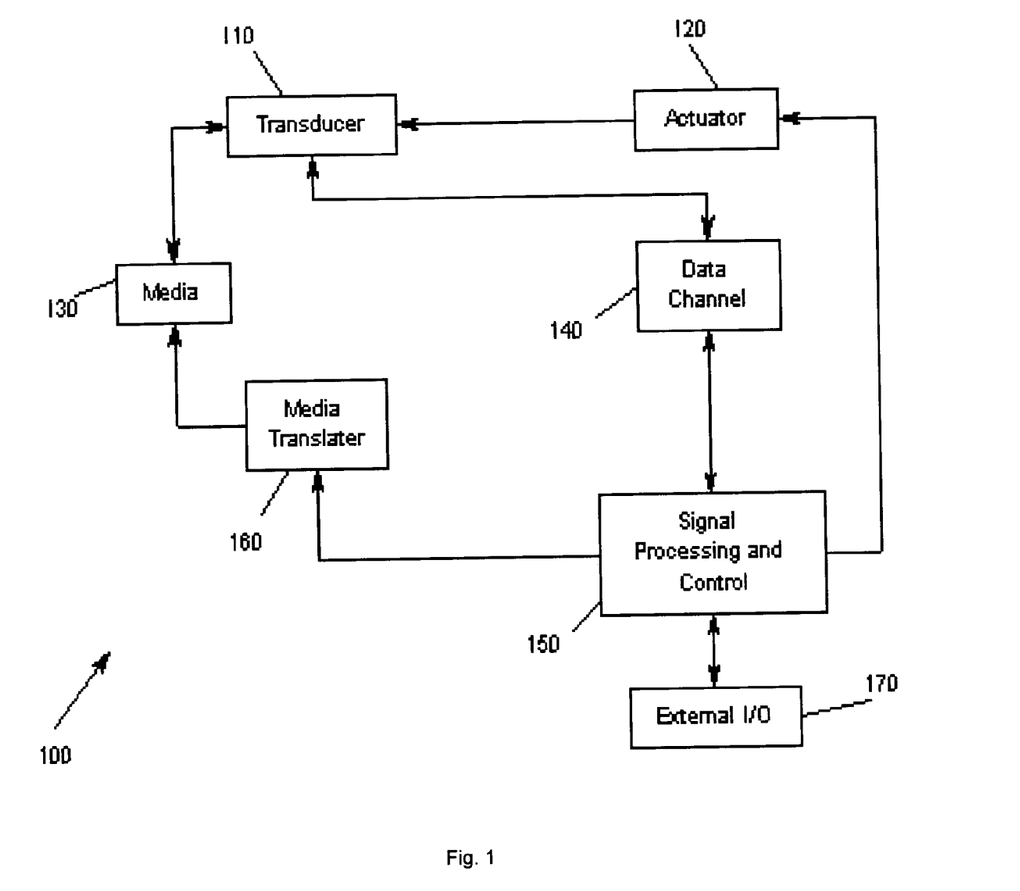
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
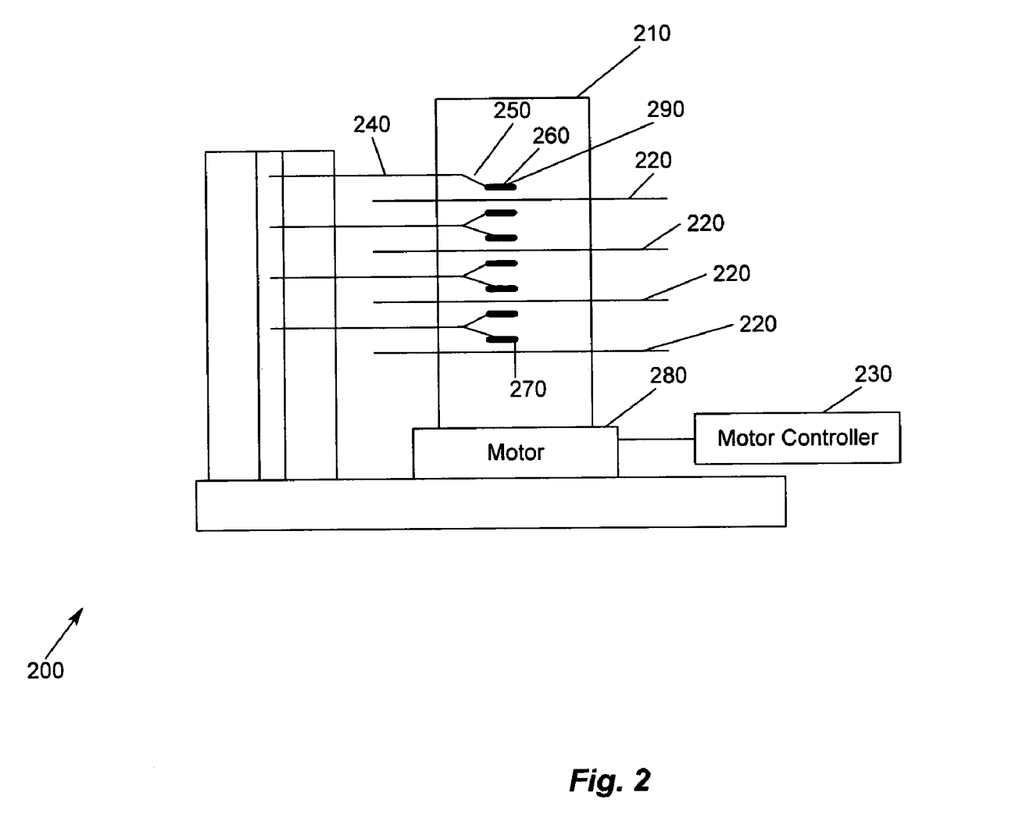
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 260 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

Figure 3:
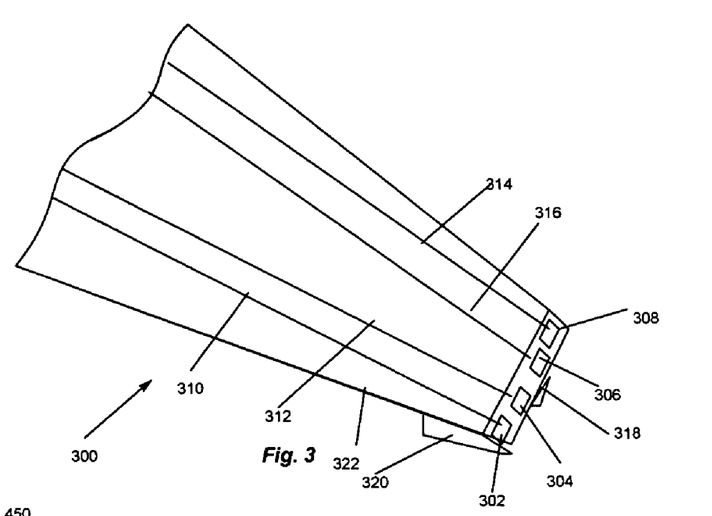
FIG. 3 illustrates a slider mounted on a suspension according to an embodiment of the present invention.

FIG. 3 is a diagram 300 that illustrates a slider 320 mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

Figure 4:
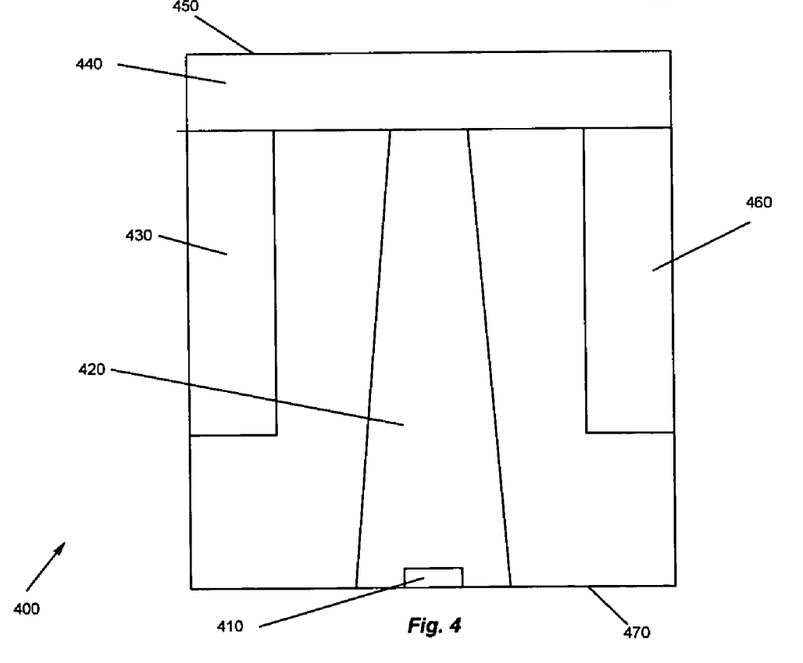
FIG. 4 illustrates an ABS view of the slider and the magnetic head according to an embodiment of the present invention.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1–4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

Figure 5:
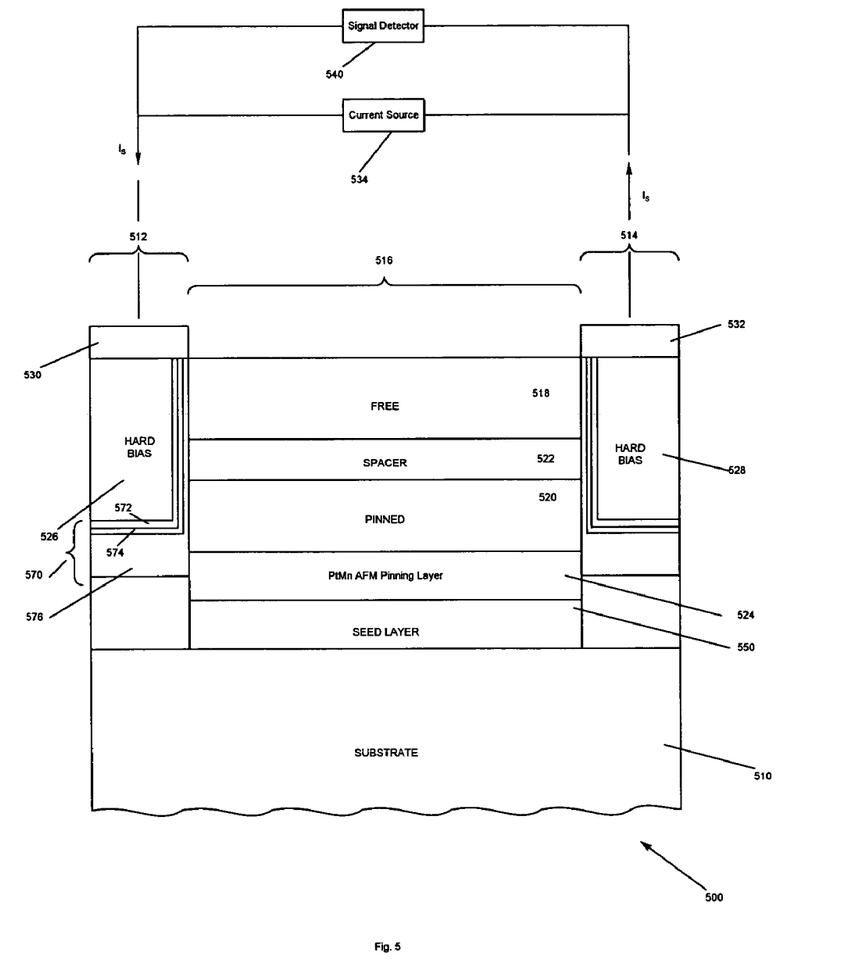
FIG. 5 illustrates an air bearing surface view of a GMR sensor according to an embodiment of the present invention.

FIG. 5 illustrates an air bearing surface view of a GMR sensor 500 according to an embodiment of the present invention. GMR heads are very attractive for use as high density recording magneto resistive (MR) heads because of their high readback output voltages, linear response, and symmetrical read sensitivity profiles.

In FIG. 5, an air bearing surface view of a GMR sensor 500 including end regions 512 and 514 separated by a central region 516 is shown. A free layer (free ferromagnetic layer) 518 is separated from a pinned layer (AP-pinned ferromagnetic layer) 520 by a non-magnetic, electrically-conducting spacer layer 522 (typically, primarily copper). The magnetization of the pinned layer 520 may be fixed through exchange coupling with an antiferromagnetic (AFM) layer 524. The magnetization of the free layer 518, however, is free to rotate in the presence of an external field. Free layer 518, spacer layer 522, pinned layer 520 and the AFM layer 524 are all formed in the central region 516.

Hard bias layers 526 and 528 formed in the end regions 512 and 514, respectively, provide longitudinal bias for the free layer 518. A seedlayer structure 550 is provided to promote the texture and enhance the grain growth of each of the spin valve stack layers. Leads 530 and 532 formed over hard bias layers 526 and 528, respectively, provide electrical connections for the flow of the sensing current $I_s$, from a current source 534 to the GMR sensor 500. A signal detector 540, which is electrically connected to the leads 530 and 532, senses the change in resistance of the GMR sensor 500 due to changes induced by the external magnetic field (e.g., the field generated when a field transition on a disk is moved past the GMR sensor 500). A cap (not shown) is optionally provided on the free layer 518.

During the manufacturing of a read/write head for magnetic recording media, the write head may be formed adjacent to the GMR sensor 500. One skilled in the art will realize that during the manufacture of the write head, and during some of the processes involved in manufacturing the GMR sensor 500, itself, high temperature processes have inevitably been involved. (Examples are the photoresist baking of the write head, the annealing of the AFM layer 524 materials on a substrate 510, which is required for some materials, and resetting of the pinned layer 520). At these temperatures, the grain boundaries of adjacent materials tend to become aligned, notably at the junction of the spacer 522 and the free layer 518 and/or at the boundary of the spacer 522 and the pinned layer 520. In this condition, it is very easy for diffusion between such layers to occur. This results in a degradation of the output signal amplitude produced by the GMR sensor 500.

Other constructions of the GMR sensor 500 are possible, and one skilled in the art could readily adapt the present invention for use with such alternative constructions. For example, where pinned layers 520 having multiple layers are used, multiple iterations of the spacer 522 (and diffusion barrier) could also be employed.

Within the sandwich structure of the GMR head sensor, i.e., "sensing free layer", "conducting space layer", and "pinned layer", the magnetization of the free layer 518 is free to respond to external magnetic field from the media. The magnetization of the pinned layer 520 is pinned at about 90° to the magnetization of the free layer 518. As the conduction electrons are scattered between the free 518 and pinned 520 layers through the spacer 522, the electrical resistance of the head changes in response to the angle of the directions of magnetization between the free 518 and pinned 520 layers.

In order to obtain a noise-free reproducing waveform, a hard magnetic bias structure 526, 528 is required to suppress the domain walls movement of the free layer. This is accomplished by depositing hard magnetic thin films 526, 528 in adjacent to the spin valve structure 518–524 on both sides. The hard magnetic thin films 526, 528 supply longitudinal magnetic flux to saturate the free layer 518 along its easy axis to a single domain state. A seedlayer structure 550 is typically used to promote the texture and enhance the grain growth of each of the layers 520, 522, 524, 516.

For hard magnetic thin films 526, 528 to be used in a GMR head, three fundamental magnetic properties are required in order to prevent Barkhausen noise (due to domain movement, as mentioned above). First, to ensure that a stable reproducing characteristic is maintained even when an external magnetic field is applied, the hard magnetic bias layers 526, 528 must have large coercive force ($H_c$). Second, the in-plane remnant magnetization ($M_r$) or $M_r$ times thickness $M_t$) should be large enough, since this is the component of the hard magnetic bias layers 526, 528 that provides the longitudinal bias flux.

If the $M_r$ of the hard magnetic bias layers 526, 528 is less than the $M_r$ of the free layer 518, with the shared abutting junction, longitudinal bias for the free layer 518 is bound to fall short of supplying the necessary flux. This implies that the squareness ($M_r/M_s$) of the hysteresis loop of the hard bias layer along the in-plane direction should be high. Further, in order to provide the biasing field and prevent noise a hard bias layers 526, 528 having a high coercivity is needed.

Properties of the hard bias layers 526, 528 degrade significantly when deposited on spin valve layers. In order to make high areal density heads, partially milled sensor structures have been considered. The properties of the hard bias layers 526, 528, however, are degraded significantly on PtMn or on other spin valve layers when deposited using the standard chromium (Cr) seedlayer structure. Therefore, the properties of the hard bias layers 526, 528 are improved using a hard bias seedlayer structure 570 that includes at least a layer of chromium or chromium molybdenum 572 and a layer 574 of silicon. Further, benefits are achieved when the hard bias seedlayer structure 570 includes a layer of tantalum 576. Those skilled in the art will recognize that the present invention is not meant to be limited to thicknesses implied in FIG. 5.

Figure 6:
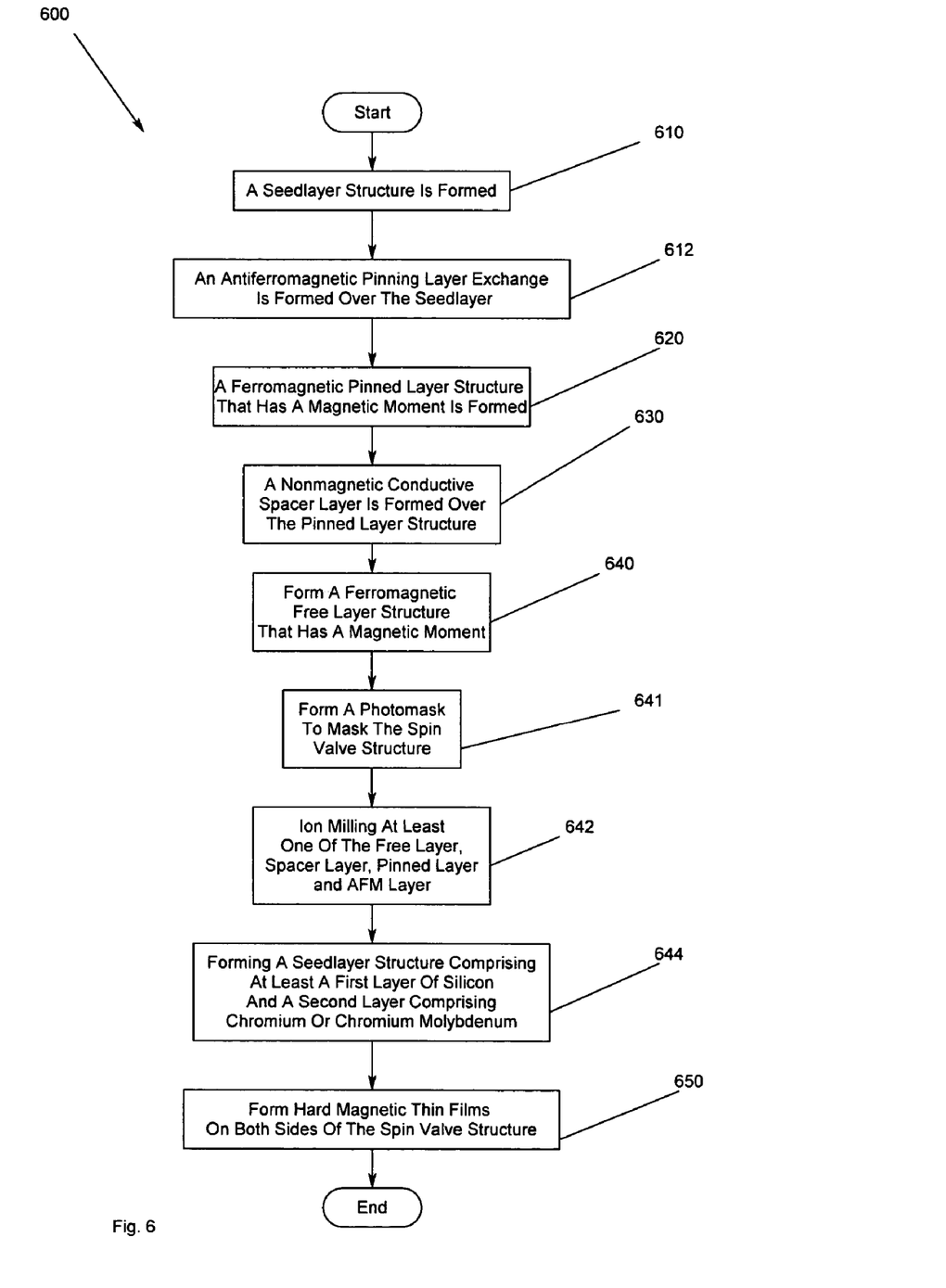
FIG. 6 is a flow chart for providing a seedlayer structure according to embodiments of the present invention that provides significant improvement in the properties of the hard bias layer when deposited on PtMn or on other spin valve layers.

FIG. 6 is a flow chart 600 for providing a seedlayer structure according to embodiments of the present invention that provides significant improvement in the properties of the hard bias layer when deposited on PtMn or on other spin valve layers. In FIG. 6, a spin valve seedlayer is formed 610. An anti-ferromagnetic pinning layer is formed over the spin valve seedlayer 612. A ferromagnetic pinned layer structure that has a magnetic moment is formed 620. A nonmagnetic conductive spacer layer is formed over the pinned layer structure 630. A ferromagnetic free layer is formed over the spacer layer 640. A photomask is formed over the spin valve structure to mask the spin valve structure during ion milling 641. At least one of the free layer, spacer layer, pinned layer and anti-ferromagnetic layer is ion milled 642. A hard bias seedlayer structure is formed, wherein the hard bias seedlayer structure comprises at least a first layer of silicon and a second layer comprising chromium or chromium molybdenum 644. The silicon layer may be formed on a layer of tantalum to form a trilayer seedlayer structure. Hard magnetic thin films are formed in an abutting relationship with the free layer structure on both sides of the free layer structure 650.

Referring again to FIG. 5, the hard bias seedlayer structure 570 according to embodiments of the present invention allows partially ion milling the sensor down to the PtMn 524 or other spin valve layers and depositing the hard bias layer 526, 528 to form the junctions. The deposition of the hard bias 526, 528 on PtMn or on other spin valve layers eliminates the thick seedlayer structure requirement for pinned spin valve structures. The hard bias seedlayer structure 570 according to embodiments of the present invention provides significant benefits to form ultra contiguous junctions (i.e., junctions having sharp edges) because it will dramatically reduce the amount of the sidewall deposition. Furthermore, this will significantly reduce the complexity of the ion milling process for pinned spin valve structures. Therefore, the hard bias seedlayer structure 570 includes at least a layer of silicon 572 and a layer 574 comprising chromium or chromium molybdenum. Further, as described above, the silicon layer may be formed on a layer of tantalum 576 to form a trilayer seedlayer structure.

Figure 7:
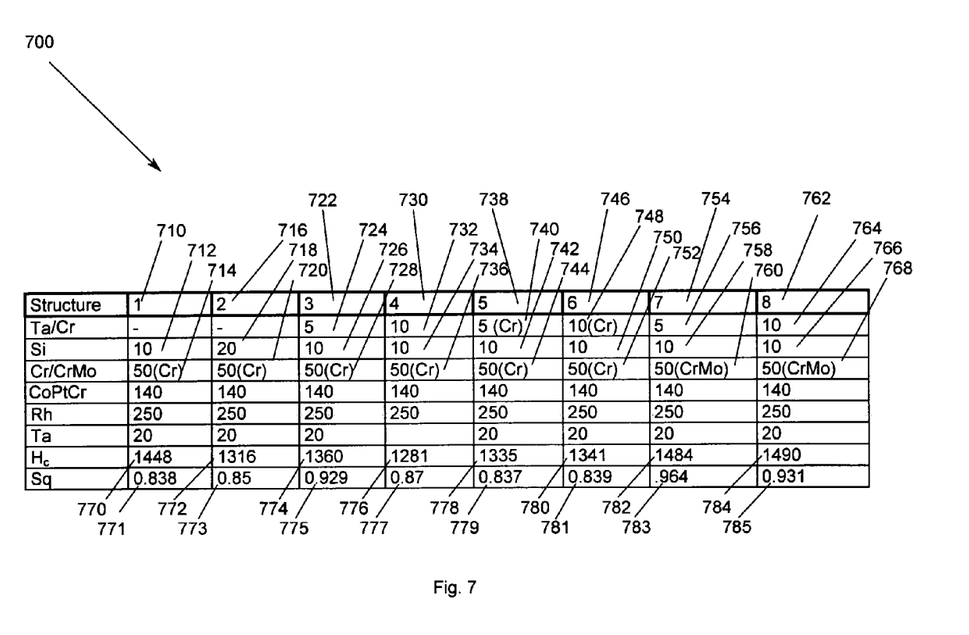
FIG. 7 is a table showing the hard bias seedlayer structures and hard bias properties on PtMn coated substrates or other spin valve layers according to embodiments of the present invention.

FIG. 7 illustrates a table 700 that shows the hard bias coercivity and the squareness with various seedlayer structure combinations. As seen, the Ta/Si/CrMo seems to provide better $H_c$ and squareness, while all other seedlayers improve the $H_c$ of the hard bias. For example, with standard chromium seedlayer structures, the coercivity and squareness of the hard bias on PtMn coated substrate or on other spin valve layers are approximately 500 Oe and 0.8 respectively.

Referring to FIG. 7, the first structure 710 includes a seedlayer structure of silicon 712 and chromium 714. The coercivity 770 is increased but the effect on the squareness 771 is less significant. The second structure 716 also includes a seedlayer structure of silicon 718 and chromium 720, but with the thickness of the silicon layer 718 increased. When compared to the first structure 710, the coercivity 772 is reduced some, but the squareness 773 increases, albeit slightly.

The third structure 722 includes a seedlayer structure of tantalum 724, silicon 726 and chromium 728. When compared to the first structure 710, the coercivity 774 is reduced some, although not as much as in the second structure 716, and the squareness 775 increases significantly. The fourth first structure 730 includes a seedlayer structure of tantalum 732, silicon 734 and chromium 736, with the thickness of the tantalum 732 increased over thickness of the tantalum 724 of the third structure 722. This, reduces both the coercivity 776 and squareness 777.

The fifth structure 738 includes a seedlayer structure of chromium 740, silicon 742 and chromium 744. The coercivity 778 is greater than 1300 Oe, but the squareness 779 is still less than 0.9. The same is true for the sixth structure 746, which includes a seedlayer structure of chromium 748, silicon 750 and chromium 752, wherein the thickness of the chromium layer 748 is doubled over the chromium layer 740 of the fifth structure 738. The coercivity 780 and the squareness 781 of the sixth structure 746 are about the same as the coercivity 778 and squareness 779 of the fifth structure 738.

The seventh 754 and eighth 762 structures show the greatest improvement. The seventh structure 754 includes a seedlayer structure of tantalum 756, silicon 758 and chromium-molybendum 760. The coercivity 782 is increased significantly as is the squareness 783. The eighth structure 762 doubles the thickness of the tantalum layer 764, but still includes silicon 766 and chromium-molybendum 768. This increases the coercivity 784 slightly, but decreases the squareness 785 slightly.

Accordingly, the properties of the hard bias layer are improved using a seedlayer structure that includes at least a first layer of silicon and a second layer comprising chromium or chromium molybdenum. Further, benefits are achieved when the seedlayer structure includes a layer of tantalum.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A magnetic storage system, comprising:
a moveable magnetic recording medium;
an actuator disposed proximate to the moveable magnetic recording medium; and
a read head, coupled to the actuator, for reading data on the moveable magnetic recording medium, the read head comprising
a spin valve structure including:
a ferromagnetic free layer structure that has a magnetic moment;
a ferromagnetic pinned layer structure having a magnetic moment;
a nonmagnetic conductive spacer layer between the free layer structure and the pinned layer structure; and
an anti-ferromagnetic pinning layer coupled to the pinned layer structure for pinning the magnetic moment of the pinned layer structure;
hard magnetic thin films disposed on both sides of the free layer structure; and
a hard bias seedlayer structure adjacent to at least a portion of the spin valve structure, wherein the hard bias seedlayer structure comprises at least a layer consisting of silicon and a layer comprising chromium or chromium molybdenum.

2. The magnetic storage system of claim 1, wherein the anti-ferromagnetic pinning layer further comprises a layer of platinum manganese.

3. The magnetic storage system of claim 1, wherein the hard bias seedlayer structure further comprises a layer of tantalum adjacent the silicon layer.

4. The magnetic storage system of claim 3, wherein the layer of tantalum adjacent the silicon layer further comprises equal thickness of the tantalum and silicon layers.

5. The magnetic storage system of claim 3, wherein the layer of tantalum adjacent the silicon layer further comprises a tantalum layer with a thickness half a thickness of the silicon layer.

6. The magnetic storage system of claim 3, wherein the hard bias seedlayer structure further comprises a chromium alloy layer.

7. The magnetic storage system of claim 1, wherein the hard bias seedlayer structure further comprises a layer of tantalum, silicon and chromium.

8. The magnetic storage system of claim 1, wherein the hard bias seedlayer structure further comprises a layer of tantalum, silicon and chromium-molybendum.

9. A magnetic storage system, comprising:
a read head, coupled to the actuator, for reading data on the moveable magnetic recording medium, the read head comprising
a spin valve structure including:
a ferromagnetic free layer structure that has a magnetic moment;
a ferromagnetic pinned layer structure having a magnetic moment;
a nonmagnetic conductive spacer layer between the free layer structure and the pinned layer structure; and
an anti-ferromagnetic pinning layer coupled to the pinned layer structure for pinning the magnetic moment of the pinned layer structure;
hard magnetic thin films disposed on both sides of the free layer structure; and
a hard bias seedlayer structure adjacent to at least a portion of the spin valve structure, wherein the hard bias seedlayer structure comprises at least a layer consisting of silicon and a layer comprising chromium or chromium molybdenum.

10. The magnetic storage system of claim 9, wherein the anti-ferromagnetic pinning layer further comprising a layer of platinum manganese.

11. The magnetic storage system of claim 9, wherein the hard bias seedlayer structure further comprises a layer of tantalum adjacent the silicon layer.

12. The magnetic storage system of claim 11, wherein the layer of tantalum adjacent the silicon layer further comprises equal thickness of the tantalum and silicon layers.

13. The magnetic storage system of claim 11, wherein the layer of tantalum adjacent the silicon layer further comprises a tantalum layer with a thickness half a thickness of the silicon layer.

14. The magnetic storage system of claim 11, wherein the hard bias seedlayer structure further comprises a chromium alloy layer.

15. The magnetic storage system of claim 9, wherein the hard bias seedlayer structure further comprises a layer of tantalum, silicon and chromium.

16. The magnetic storage system of claim 9, wherein the hard bias seedlayer structure further comprises a layer of tantalum, silicon and chromium-molybendum.

17. A spin valve sensor, comprising
a spin valve structure including a ferromagnetic free layer, a ferromagnetic pinned layer and an anti-ferromagnetic pinning layer;
hard magnetic thin films disposed on both sides of the spin valve structure; and
a hard bias seedlayer structure adjacent to at least a portion of the spin valve structure, wherein the hard bias seedlayer structure comprises at least a layer consisting of silicon and a layer comprising chromium or chromium molybdenum.

18. The spin valve sensor of claim 17, wherein the pinning layer comprises platinum manganese.

19. The spin valve sensor of claim 17, wherein the hard bias seedlayer structure further comprises a layer of tantalum adjacent the silicon layer.

20. The spin valve sensor of claim 19 wherein the layer of tantalum adjacent the silicon layer further comprises equal thicknesses of the tantalum and silicon layers.

21. The spin valve sensor of claim 19, wherein the layer of tantalum adjacent the silicon layer further comprises a tantalum layer with a thickness half a thickness of the silicon layer.

22. The spin valve sensor of claim 19, wherein the hard bias seedlayer structure further comprises a chromium alloy layer.

23. The spin valve sensor of claim 17, wherein the hard bias seedlayer structure further comprises a layer of tantalum, silicon and chromium.

24. The spin valve sensor of claim 17, wherein the hard bias seedlayer structure further comprises a layer of tantalum, silicon and chromium-molybendum.

25. A read sensor, comprises:
means for providing a spin valve structure, means for providing a spin valve structure further comprising:
means for providing a ferromagnetic free layer structure that has a magnetic moment;
means for providing a ferromagnetic pinned layer structure having a magnetic moment;
means for providing a nonmagnetic conductive spacer layer between the means for providing a ferromagnetic free layer structure and the means for providing a ferromagnetic pinned layer structure; and
means for providing an anti-ferromagnetic pinning layer coupled to the means for providing a pinned layer structure for pinning the magnetic moment of the pinned layer structure;
means for providing hard magnetic thin films adjacent to at least a portion of the means for providing a spin valve structure; and
means for providing a hard bias seedlayer structure adjacent the at least a portion of the means for providing a spin valve structure, wherein the means for providing a hard bias seedlayer structure comprises at least a layer consisting of silicon and a layer comprising chromium or chromium molybdenum.

26. A spin valve sensor, comprising
means for providing a spin valve structure including free means, pinned means and an pinning means;
means for providing hard magnetic thin films in an abutting relationship with the means for providing a spin valve structure on both sides of the means for providing a spin valve structure; and
means for providing a hard bias seedlayer structure adjacent the means for providing a spin valve structure, wherein means for providing the hard bias seedlayer structure comprises at least a layer consisting of silicon and a layer comprising chromium or chromium molybdenum.

27. A hard bias seedlayer structure adjacent a pinning layer structure, the seedlayer structure comprising at least a layer comprising silicon and a layer consisting of chromium or chromium molybdenum.

28. The seedlayer structure of claim 27, wherein the seedlayer structure further comprises a layer of tantalum adjacent the silicon layer.

* * * * *

UNITED STATES PATENT AND TRADEMARK OFFICE
CERTIFICATE OF CORRECTION

PATENT NO.         : 7,038,892 B2
APPLICATION NO. : 10/674831
DATED              : May 2, 2006
INVENTOR(S)       : Chau et al.

It is certified that error appears in the above-identified patent and that said Letters Patent is hereby corrected as shown below:

In Abstract: Title page (57)

Line 5: "chromium molybdenum" should read -- chromium-molybdenum --

In Drawings:

FIG. 6: "chromium molybdenum" should read -- chromium-molybdenum --

In Summary of the Invention:

Col. 3, line 12: "chromium molybdenum" should read -- chromium-molybdenum --
Col. 3, line 33: "chromium molybdenum" should read -- chromium-molybdenum --
Col. 3, line 50: "chromium molybdenum" should read -- chromium-molybdenum --
Col. 3, line 60: "chromium molybdenum" should read -- chromium-molybdenum --
Col. 4, line 14: "chromium molybdenum" should read -- chromium-molybdenum --
Col. 4, line 26: "chromium molybdenum" should read -- chromium-molybdenum --
Col. 4, line 32: "chromium molybdenum" should read -- chromium-molybdenum --

In Detailed Description of the Invention:

Col. 5, line 16: "chromium molybdenum" should read -- chromium-molybdenum --
Col. 7, line 55: "chromium molybdenum" should read -- chromium-molybdenum --
Col. 8, line 10: "chromium molybdenum" should read -- chromium-molybdenum --
Col. 8. line 66: "Q.9" should read --.9 --
Col. 9, line 10: "chromium-molybendum" should read -- chromium-molybdenum --
Col. 9, line 13: "chromium-molybendum" should read -- chromium-molybdenum --
Col. 9, line 19: "chromium molybdenum" should read -- chromium-molybdenum --

UNITED STATES PATENT AND TRADEMARK OFFICE
CERTIFICATE OF CORRECTION

PATENT NO. : 7,038,892 B2
APPLICATION NO. : 10/674831
DATED : May 2, 2006
INVENTOR(S) : Chau et al.

It is certified that error appears in the above-identified patent and that said Letters Patent is hereby corrected as shown below:

In What is Claimed:

Col. 9, line 57: "chromium molybdenum" should read -- chromium-molybdenum --
Col. 10, line 13: "chromium-molybendum" should read -- chromium-molybdenum --
Col. 10, line 35: "chromium molybdenum" should read -- chromium-molybdenum --
Col. 10, line 57: "chromium-molybendum" should read -- chromium-molybdenum --
Col. 11, line 2: "chromium molybdenum" should read -- chromium-molybdenum --
Col. 11, line 23: "chromium-molybendum" should read -- chromium-molybdenum --
Col. 12, line 11: "chromium molybdenum" should read -- chromium-molybdenum --
Col. 12, line 25-26: "chromium molybdenum" should read -- chromium-molybdenum --
Col. 12, line 29: "comprising" should read -- consisting of --
Col. 12, line 29: "consisting of" should read -- comprising --
Col. 12, line 30: "chromium molybdenum" should read -- chromium-molybdenum --

Signed and Sealed this

Twenty-fourth Day of October, 2006

JON W. DUDAS
*Director of the United States Patent and Trademark Office*

Fig. 6